United States Patent
Pfaffenberger

[15] 3,647,273
[45] Mar. 7, 1972

[54] CYLINDRICAL ROLLER BEARING CAGE

[72] Inventor: Eugene E. Pfaffenberger, Indianapolis, Ind.

[73] Assignee: FMC Corporation, San Jose, Calif.

[22] Filed: Mar. 23, 1970

[21] Appl. No.: 21,903

[52] U.S. Cl. ........................................................308/217
[51] Int. Cl. ...............................................F16c 19/10
[58] Field of Search...............................308/217

[56] References Cited

UNITED STATES PATENTS

| 2,705,666 | 5/1955 | Gibbons | 308/217 |
| 3,141,711 | 7/1964 | Biedinger | 308/217 |

Primary Examiner—Edgar W. Geoghegan
Assistant Examiner—Frank Susko
Attorney—F. W. Anderson and C. E. Tripp

[57] ABSTRACT

This invention relates to a cage for cylindrical roller bearings wherein each spacer between adjacent roller bearings have compound curved surfaces facing the cylinder surfaces of the roller.

6 Claims, 10 Drawing Figures

PATENTED MAR 7 1972 3,647,273
SHEET 1 OF 2
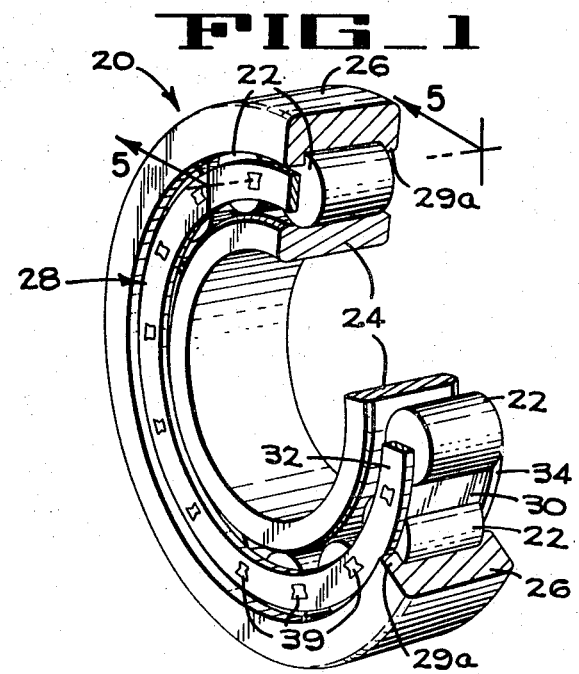
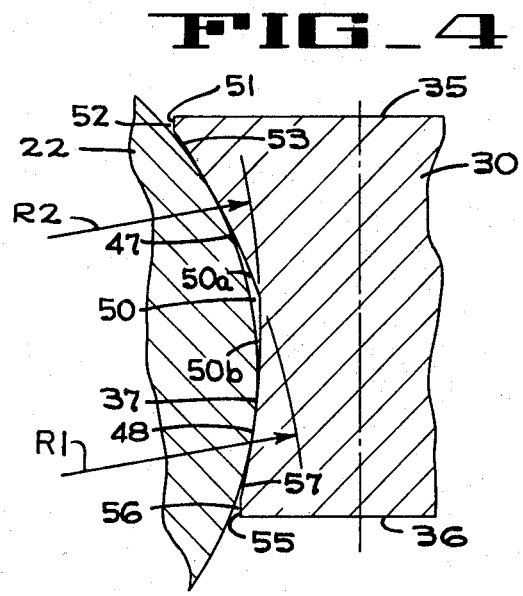
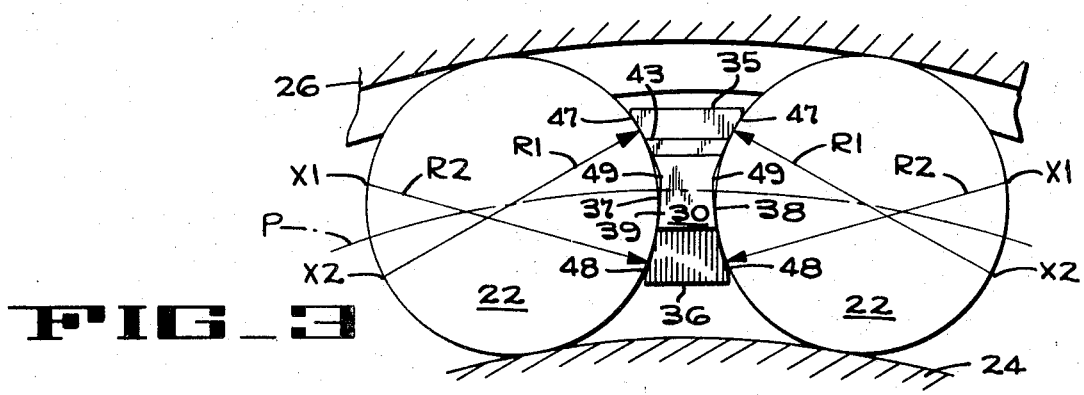
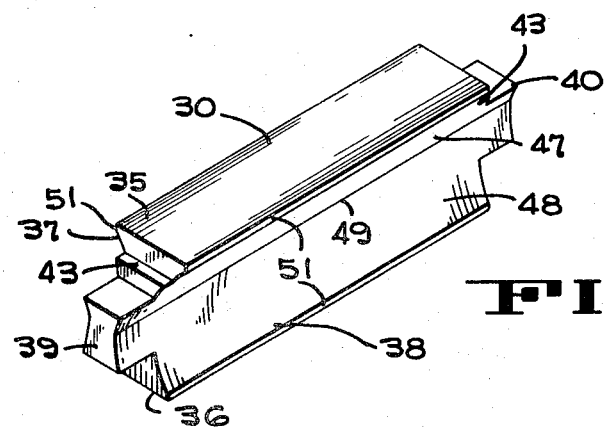
INVENTOR.
EUGENE E. PFAFFENBERGER
BY F. W. Anderson
C. E. Tripp
ATTORNEYS

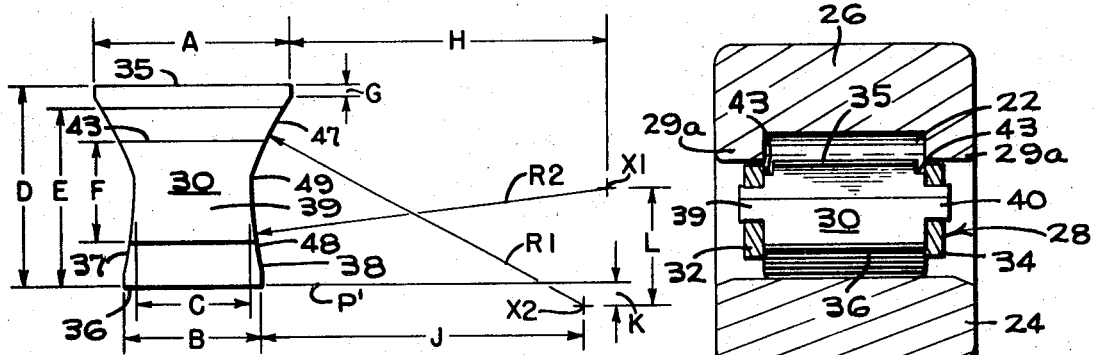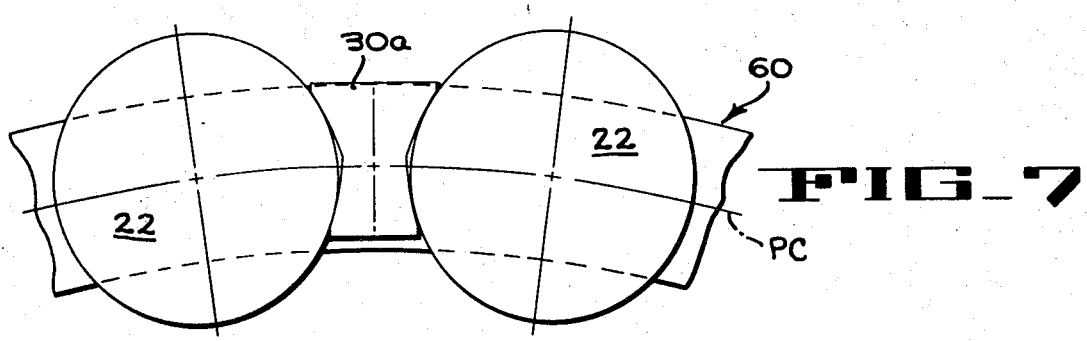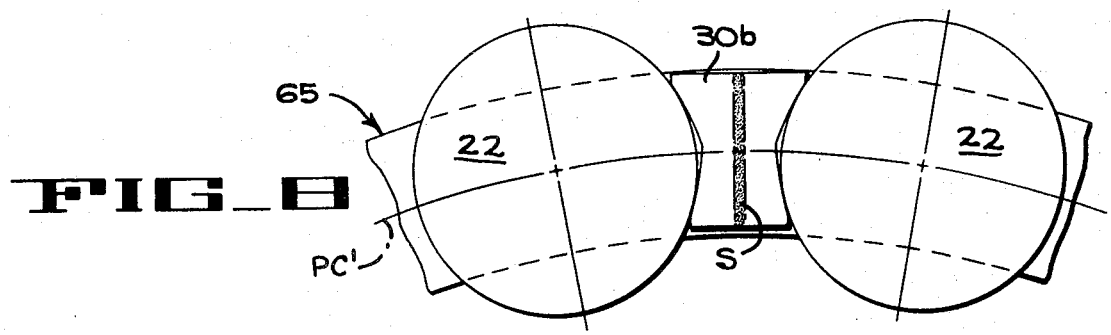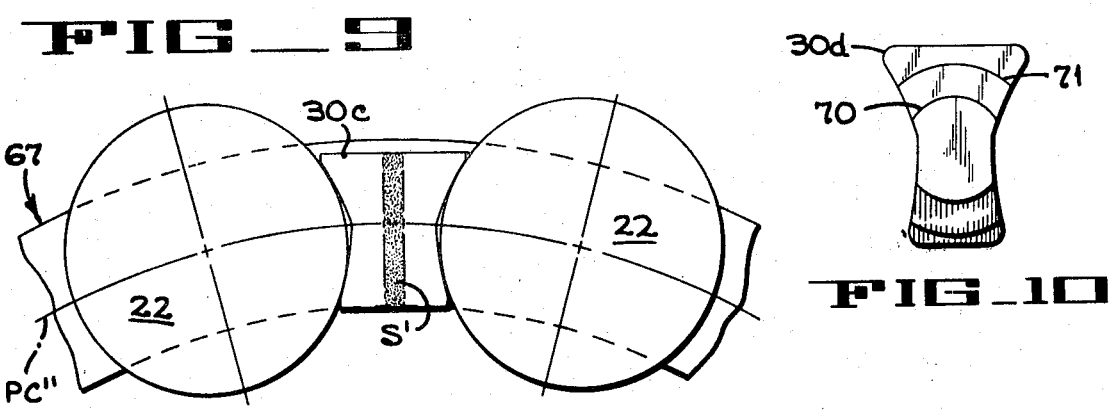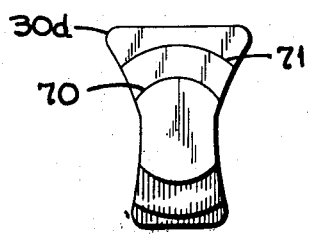

3,647,273

CYLINDRICAL ROLLER BEARING CAGE

BACKGROUND OF THE INVENTION

The invention concerns cylindrical roller bearings and more particularly relates to an improved cage for such bearings, said cage featuring spacers that have compound curved surfaces facing the rollers.

One type of bearing cage now in use makes use of spacers that have concave cylindrical surfaces in confronting relation with the cylindrical surfaces of the adjacent rollers. Such spacers are shown in the patent to Kifer, U.S. Pat. No. 2,071,797. It will be evident that, in operation, such opposed cylindrical surfaces produce a maximum amount of friction between the rollers and the spacers during operation. Other cages feature spacers bars that have flat surfaces in tangential engagement with the cylindrical rollers, such as shown in the patent to Altson, U.S. Pat. No. 3,365,255, which tend to generate large unit pressures between the spacer and the bearing.

The present invention provides a high-speed, low-friction cage by the use of spacers which have concave surfaces confronting the rollers that are formed of two intersecting radii.

Accordingly it is an object of the present invention to provide an improved cage for a cylindrical roller bearing.

Another object is to provide a spacer for the cage of a cylindrical roller bearing that is adapted for use with a range of sizes of bearings.

SUMMARY OF THE INVENTION

The cylindrical roller bearing cage of the present invention comprises spaced inner and outer races between which a plurality of cylindrical roller bearings are positioned. A spacer bar is disposed between each pair of adjacent roller bearings, all spacer bars being connected to a ring at each end of the bearing to form the improved cage of the present invention. The spacer bars are provided with two curved surfaces each of which is defined by two intersecting concave surfaces.

DESCRIPTION OF THE DRAWINGS

FIG. 1 is a fragmentary perspective of a bearing assembly incorporating the improved cage of the present invention.

FIG. 2 is an enlarged perspective of one of the spacer bars constructed in accordance with the present invention.

FIG. 3 is an enlarged fragmentary diagrammatic view of a portion of the bearing assembly of FIG. 1, particularly showing a spacer bar in operative position between two rollers.

FIG. 4 is an enlarged fragmentary diagrammatic view particularly showing the area at which the spacer bar makes contact with a roller.

FIG. 5 is an enlarged section taken substantially on line 5—5 of FIG. 1.

FIG. 6 is a diagrammatic end view of the spacer bar of FIG. 2.

FIGS. 7, 8 and 9 are diagrammatical showings of three embodiments of the spacer bar of the present invention, particularly showing the positions such bars take in bearing units of different sizes.

FIG. 10 is a diagrammatic end elevation of a second embodiment of the spacer bar of the present invention.

DESCRIPTION OF THE PREFERRED EMBODIMENTS

In FIG. 1 the reference numeral 20 indicates a bearing assembly having a plurality of cylindrical rollers 22 disposed between an inner race 24 and an outer race 26. A cage 28, which retains the rollers in place in equally spaced relation, comprises a plurality of spacer bars 30 secured between identical end rings 32 and 34.

Each spacer bar 30 (FIG. 2) is an elongate member having flat rectangular upper and lower wall surfaces 35 and 36, respectively, and concave side surfaces 37 and 38, respectively (FIG. 3). The ends of the bar are reduced to form projections or trunnions 39 and 40, which, during assembly of the bearings, are fitted into holes in the end rings 32 and 34 respectively and swaged over to lock the end rings together. Since the outer ring 26 has an inwardly projecting rib 29a (FIG. 5) at each end, the upper portion of the bar 30 is provided with stepped upper edge portions near each end that define recesses 43 which eliminate the possibility that the upper wall surface 35 will ever engage either of the ribs 29a.

The side surfaces 37 and 38 of each spacer bar are identical, only oppositely disposed and, as seen in FIG. 2, each surface comprises two partial cylindrical surfaces 47 and 48 that intersect along a line 49. The radii R1 and R2 of the cylinders containing surfaces 47 and 48 are identical and, as seen in FIg. 3, the axis X1 about which surface 48 is generated is above the pitch circle P of the rollers, while the axis X2 for surface 47 is below the pitch circle. As a result, a zone 50 (FIG. 4) is formed between the surface of each roller and the surfaces 47 and 48 of the adjacent spacer bar. This zone provides two wedge-shaped spaces 50a and 50b which receives and retains lubricating oil and cause the formation of wedges of lubricant during the operation of the bearing. A flat lip 51 extends downwardly from each edge of the upper surface 35, each lip cooperating with the adjacent roller surface to define a wedge-shaped entrance 52 which leads to a relatively thin wedge entrance 53 between the roller and the curved surface 47 of the spacer bar. Similarly at the lower end of the spacer bar, lips 55 cooperate with the adjacent roller surfaces to define wedge-shaped entrances 56 which lead to relatively thin wedges 57. Thus, during rotation of the roller in either direction relative to the spacer bar, lubricant wedges are formed to assure adequate lubrication of the adjacent confronting surfaces of the roller and the spacer bar.

The radii R1 and R2 for the intersecting cylindrical surfaces 47 and 48 are identical and are slightly greater than the diameter of the cylindrical rollers 22 with which they cooperate. In one successful installation, the rollers 22 have a diameter of 0.4985 inches while R1 and R2 are each 0.500 inches. An end view of the spacer bar 30 of this installation is shown in FIG. 6, and it will be noted that the axis X1 of surface 48 is above a plane P' containing the surface 36, while the axis X2 of surface 47 is below said plane. The value of D was 0.268 inches; E was 0.240 inches; F was 0.134 inches; G was 0.015 inches; H was 0.446 inches; J was 0.454 inches; K was 0.029 inches; and L was 0.160 inches.

This spacer bar of FIG. 6, having R1 and R2 equal to 0.500 inches and having the above-mentioned dimensions, is usable with a range of cylindrical bearing units of different sizes that employ rollers of the size of rollers 22. The only dimensions that must be varied are dimensions A, B and C to accommodate changes in the distance between the centers of rollers due to changes in the number of rollers. In FIG. 7 a bearing assembly 60 is illustrated wherein the pitch circle PC of the rollers 22 has a diameter of 4.73 inches and there are 24 rollers. In this case the dimension A of spacer bar 30a is 0.211 inches; B is 0.132 inches; and C is 0.103 inches. In FIG. 8 a bearing assembly 65 is illustrated wherein the pitch circle PC' of the rollers 22 has a diameter of 3.660 inches and there are 18 rollers. In this case, the dimension A of each spacer bar 30b is 0.229 inches; B is 0.150 inches; and C is 0.121 inches. In FIG. 9 a bearing assembly 67 is illustrated wherein the diameter of the pitch circle PC'' is 2.55 inches and there are 12 rollers 22. The dimension A of each spacer bar 30c is 0.255 inches; B is 0.176 inches; and C is 0.147 inches.

It should be noted that the only change to the spacer bars that is necessary to adapt them for use with cylindrical bearings of different sizes is the varying of the width of the bars. Thus it will be seen that the spacer 30b (FIG. 8) is wider than spacer 30a (FIG. 7) by the amount indicated by the stippled area S of FIG. 8. Similarly, the spacer 30c (FIG. 9) is wider than the spacer 30a by the amount indicated by the stippled area S'.

Referring to FIGS. 2 and 3 it will be noted that the surfaces 37 and 38 form a continuous surface which makes possible the production of the retainer bars with simplified manufacturing techniques. In one such method, each spacer bar is formed of powdered metal in a die cavity having a longitudinal cross section conforming to the shape of the bar, as seen in FIG. 5. A pair of punches, which have opposed leading faces that are the complements of the surfaces 37 and 38 (FIG. 6), are arranged to simultaneously move inwardly of the die cavity from opposite sides to compress the powdered metal in the cavity and form the bar. Since the only variable dimensions for the spacer bar are A, B, and C, different size bars can be made merely by varying the amount of powder placed in the cavity and the force with which the punches are pressed together.

A second simplified method of manufacture involves making the rods from rolled steel wire which have been rolled to rough form and then drawn through a die to produce a rod having a length of 12 feet, for example, and a transverse cross section corresponding to the peripheral configuration of the bar 30d as shown in FIG. 10. The 12 foot rod is cut into segments of the desired length, and each end of each segment is turned in a multiple spindle screw machine to form a fragmentary cylindrical end surface 70 that defines the trunnion at that end, and a fragmentary cylindrical surface 71 that provides the recess corresponding to recess 43 of FIG. 5.

Thus, the provision of intersecting concave surfaces in opposed relation to the rollers of a cylindrical roller bearing assembly not only assures the efficient lubrication of the contacting surfaces of the rollers and spacer bars but also makes possible simple efficient manufacturing methods. Further, the use of a continuous concave surface of particular curvature, relative to the cylindrical rollers of the unit, provides a spacer bar that can be adapted easily for use with many sizes of bearings, which use a particular diameter roller, merely by varying the width of the bar without changing the curvature of the concave surface.

Although the best mode contemplated for carrying out the present invention has been herein shown and described, it will be apparent that modification and variation may be made without departing from what is regarded to be the subject matter of the invention.

What is claimed is:

1. A retainer for the rollers of a cylindrical roller bearing unit comprising a pair of spaced end rings, and a plurality of equally spaced spacer bars secured between said end rings to form an annulus, each adjoining pair of bars having opposed concave surfaces adapted to receive a cylindrical roller therebetween, each concave surface being defined by two partial cylindrical surfaces formed about axes parallel to the axis of the roller and intersecting along a line, the respective centers of the radii of said partial cylindrical surfaces being spaced apart and located on opposite sides of a line tangent to the pitch circle of the rollers at the center of each roller.

2. A retainer according to claim 1 wherein said two partial cylindrical surfaces are formed by radii of equal length and wherein said radii are slightly larger in size than the diameter of the cylindrical roller disposed between said adjoining spacer bars.

3. A retainer according to claim 2 wherein said radii are approximately 0.500 inches and said roller diameter is 0.4985 inches.

4. A retainer for the rollers of a cylindrical roller bearing unit comprising a pair of spaced end rings, and a plurality of equally spaced spacer bars secured between said end rings to form an annulus, each adjoining pair of bars having opposed concave surfaces adapted to receive a cylindrical roller therebetween, each concave surface being defined by two partial cylindrical surfaces formed about axes parallel to the axis of the roller and intersecting along a line, said two partial cylindrical surfaces being further formed by radii of equal length and said radii are slightly larger in size than the diameter of the cylindrical roller disposed between said adjoining spacer bars, the differential between said radii and said roller diameter defining a lubrication pocket between said roller and each spacer bar surface, said pocket being relatively wide at its central area and tapering in opposite directions away from the area to define wedge-shaped entrances between the roller surface and the surface of the spacer bar.

5. A retainer according to claim 4 wherein said differential between said radii and said roller diameter is such that a wedge-shaped entrance is formed between each edge of the concave spacer bar surface and the adjacent roller.

6. A retainer for the rollers of a cylindrical roller bearing unit comprising a pair of spaced end rings, and a plurality of equally spaced spacer bars secured between said end rings to form an annulus, each adjoining pair of bars having opposed concave surfaces adapted to receive a cylindrical roller therebetween, each concave surface being defined by two partial cylindrical surfaces formed about axes parallel to the axis of the roller and intersecting along a line, said two partial cylindrical surfaces being formed by radii that are slightly larger in size than the diameter of the cylindrical roller and the axis for the outermost surface is radially inward of the pitch circle of the rollers of the bearing and the axis for the innermost surface is radially outward of said pitch circle.

* * * * *